United States Patent [19]

Salmon et al.

[11] 3,780,351

[45] Dec. 18, 1973

[54] UNIVERSAL MOUNTING FRAME AND SYSTEM FOR TELEPHONE DISTRIBUTION EQUIPMENT

[75] Inventors: Garland R. Salmon; George W. Newton, both of Durham, N.C.

[73] Assignee: Newton Instrument Company, Durham, N.C.

[22] Filed: Dec. 15, 1972

[21] Appl. No.: 315,657

[52] U.S. Cl. ............ 317/119, 179/91 R, 317/122

[51] Int. Cl. ............ H02b 1/02

[58] Field of Search ............ 317/99, 118, 122; 312/223; 179/91 R, 99

[56] References Cited

UNITED STATES PATENTS

| | | | |
|---|---|---|---|
| 3,521,129 | 7/1970 | MacKenzie | 317/122 |
| 3,349,291 | 10/1967 | Olashaw | 317/99 |
| 3,309,576 | 3/1967 | Sims | 317/99 |

*Primary Examiner*—Robert K. Schaefer
*Assistant Examiner*—Gerald P. Tolin
*Attorney*—B. B. Olive

[57] ABSTRACT

This invention is directed to a mounting frame and to a system of cooperating hardware which is adapted to mount different makes of telephone distribution equipment such as terminal blocks and protectors. Terminal blocks may be mounted in vertical, horizontal, or mixed configurations, and either fixed or with bidirectional pivoting.

7 Claims, 35 Drawing Figures

PATENTED DEC 18 1973

3,780,351

SHEET 1 OF 4

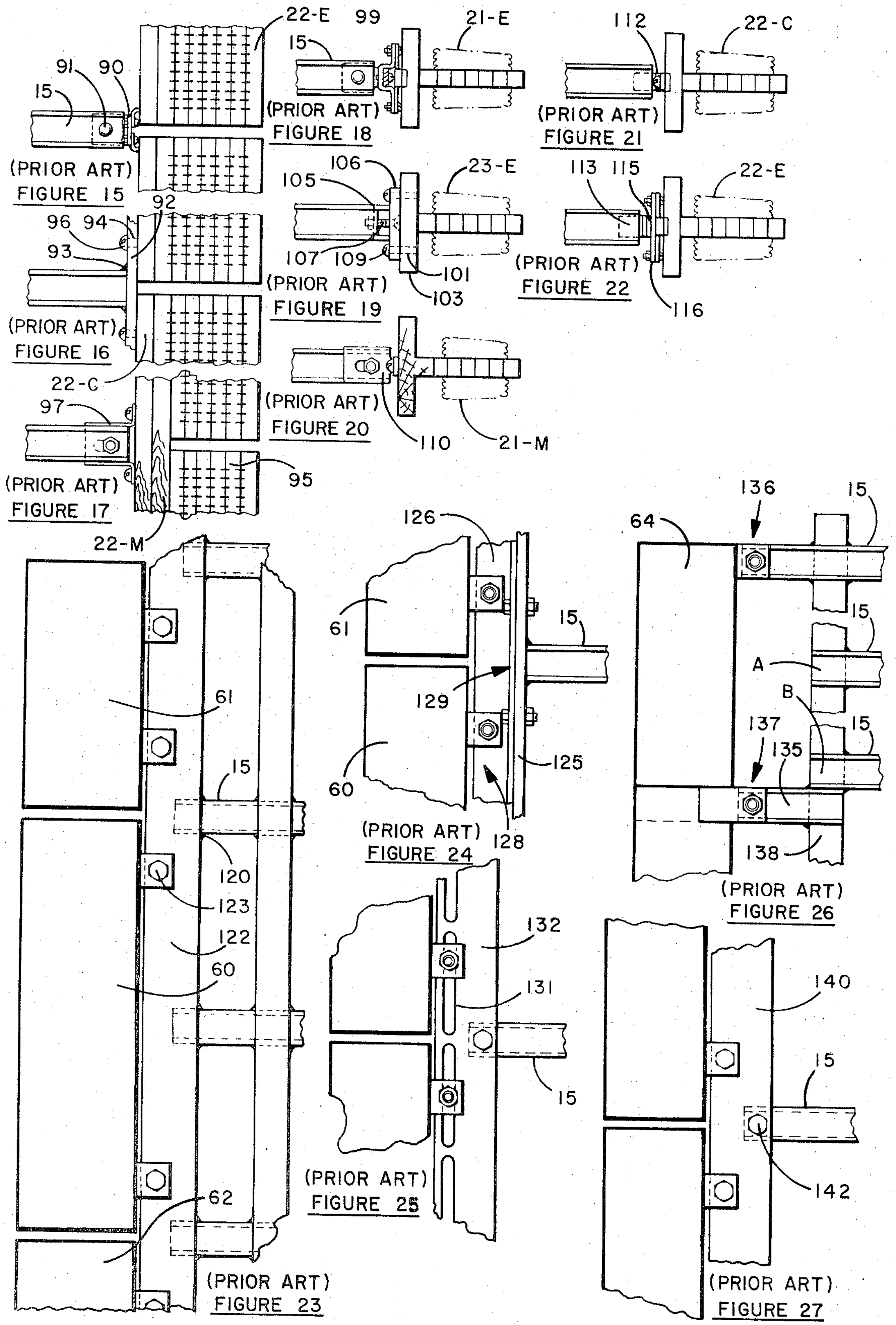
(PRIOR ART) FIGURE 15, (PRIOR ART) FIGURE 16, (PRIOR ART) FIGURE 17, (PRIOR ART) FIGURE 18, (PRIOR ART) FIGURE 19, (PRIOR ART) FIGURE 20, (PRIOR ART) FIGURE 21, (PRIOR ART) FIGURE 22, (PRIOR ART) FIGURE 23, (PRIOR ART) FIGURE 24, (PRIOR ART) FIGURE 25, (PRIOR ART) FIGURE 26, (PRIOR ART) FIGURE 27

PATENTED DEC 18 1973 3,780,351

UNIVERSAL MOUNTING FRAME AND SYSTEM FOR TELEPHONE DISTRIBUTION EQUIPMENT

BACKGROUND OF THE INVENTION

1. Field of the Invention

The invention is related generally to framing systems and more particularly to frames and associated hardware for mounting telephone distribution equipment such as terminal blocks and protectors.

2. Description of the Prior Art

Prior art in the field of telephone distribution equipment and mounting frames has largely been characterized by inflexibility and incompatibility between distribution equipment of one manufacturer and mounting frames of another. That is, the standard mounting frame of one manufacturer is not normally adapted to receive another manufacturer's distribution equipment, e.g., terminal block or protector. Due to product incompatibility and non-interchangeability in this phase of the telephone industry, central offices and switching stations have typically employed one manufacturer's distribution components. This arrangement is satisfactory until, say, a merger takes place with another company using a different manufacturer's components, or until expansion is needed and a different manufacturer's component is desired due to unique features or technical advantages. In many cases, either the necessity or desirability of employing a manufacturer's component different from the one currently is use has required substantial alteration and frequent removal of the existing frame and substitution of another.

Moreover, distribution equipment mounting, even when using the same manufacturer's frame and equipment, has been characterized by inflexibility. As an illustrative example, a telephone office may order a distributing frame and enough terminal blocks and protectors to fulfill its current and foreseeable needs. Initially, such an office may specify center mounted terminal blocks in horizontal rows and may also specify by serial number the type of protectors they wish to use. In this situation, all equipment is purchased from a single manufacturer. A distribution frame is then typically drilled on precise centers, assembled, and welded to accommodate the components specified. If it subsequently becomes desirable to use end mounted terminal blocks or a different line of protectors due to, say, increased subscriber service or merger, or simply because of office reorganization, the existing frame would not be suited and would require substantial alteration, i.e., cutting of center mounting bars, installation of end mounting clips and redrilling of holes on different centers to accept new protectors. The cost of such alterations may be sufficient to warrant replacement of the entire frame. As another example, the guard rails have been fixed and for this reason have limited the size of protectors and terminal blocks that could be used. Thus, expansion of existing equipment has been limited.

It is apparent from the above that the long-established practices in telephone distribution equipment and mounting frames, due to lack of interchangeability and compatibility between different makes, have led to a disorganized and inefficient system. Inefficiency is realized by a telephone company which must undergo major frame replacement or adaptation, and by manufacturers who must maintain exceptionally large inventories of specialized frames and related hardware. What has long been needed is a truly universal distribution frame and mounting system capable of mounting a wide variety of makes of telephone distribution components in virtually any desired configuration and in a manner adapted to permit unlimited growth and addition of new components.

SUMMARY OF THE INVENTION

The mounting frame and system of the present invention are directed to a frame structure comprising a plurality of vertical members, each including a plurality of horizontally disposed members evenly spaced along the vertical member. In the telephone art, the horizontally disposed members are often referred to as "shelves" while the vertical members are often referred to as "uprights." Each "shelf" is formed from a metal U channel which is secured on the side and is adapted to receive a hole proximate each end.

For purposes of mounting terminal blocks either in end or center mounted configuration, vertically or horizontally, a mounting lug is fitted into the end of the channel and is secured by an appropriate bolt through the hole provided. In a preferred form of the invention, the mounting lug is of rectangular form and extends slightly past the end of each shelf. Each mounting lug then receives a novel terminal block mounting bracket which is adapted for securement to the lug. Mounting of a bracket in one position will enable a terminal block to be end mounted horizontally, while 90° rotation and remounting to the lug enables vertical mounting of the block. A terminal block is furthermore adapted to be mounted between any two vertically or horizontally adjacent brackets. A stiffening bar detachably secured between each mounting pair of brackets provides center mounting for the terminal block as well as stiffening support in one position and in an alternate position may be used to stiffen when end mounting terminal blocks directly to adjacent brackets. In one embodiment, each mounting bracket provides two pivotally secured mounting ears thereby enabling standard terminal blocks to be pivoted for greater ease during testing, soldering, inspection, and the like. In another embodiment both ears are fixed.

Protectors are conventionally vertically mounted. For purposes of mounting such protectors, a vertical column of shelves receives a vertical protector mounting L channel strip which extends the height of the shelves and is secured by bolts through the provided holes in each shelf. Small clamps are provided and these are secured to each protector. The clamps are adapted to be tightened down on the mounting strip which enables the mounting of protectors having different mounting hole configurations on a single mounting strip.

To complete the invention system, an integrated adjustable guard rail assembly is provided along the base of each row of uprights as well as adjacent selected end uprights. With the foregoing in mind, the object of the invention is that of providing a coordinated framing and mounting hardware system which is essentially universal in nature and which it is believed will be of immense value in reducing inventories and in reducing the number of scrap frames and distribution parts because of lack of compatibility.

DESCRIPTION OF THE DRAWINGS

FIG. 15 is a partial side view of vertically end-mounted terminal blocks secured to a frame shelf by so-called mounting clips of the prior art.

FIG. 16 is a partial side view of vertically center-mounted terminal blocks secured to a frame shelf by means of a welded mounting bar of the prior art.

FIG. 17 is a partial side view of a vertically-mounted, continuous maple strip terminal block of the prior art secured by a prior art clip to a frame shelf.

FIG. 18 is a partial side view of a horizontally end-mounted terminal block according to the prior art secured by a prior art clip to a frame shelf.

FIG. 19 is a partial side view of a horizontally end-mounted terminal block of the prior art secured to a mounting strip and which is secured to a frame shelf by nut and bolt connection with a bent end portion of said shelf.

FIG. 20 is a partial side view of a horizontally-mounted continuous maple strip terminal block of the prior art secured to a frame shelf by a prior art clip.

FIG. 21 is a partial side view of a horizontally center-mounted terminal block secured by welded bracket means to a frame shelf according to the prior art.

FIG. 22 is a partial side view of a horizontally end-mounted terminal block secured by welded bracket means to a frame shelf according to the prior art.

FIG. 23 is a partial side view of so-called protectors mounted according to one technique of the prior art in which mounting holes are drilled on exact centers into a mounting bar welded to the sides of selected frame shelves.

FIG. 24 is a partial side view of protectors mounted according to another technique of the prior art in which mounting holes are drilled on exact centers into an angle iron bolted to a welded protector bar.

FIG. 25 is a partial side view of protectors mounted according to another technique of the prior art providing limited mounting flexibility in which elongated mounting holes are provided in a mounting bar bolted to selected frame shelves.

FIG. 26 is a partial side view of protectors of the interlocking type mounted according to yet another mounting technique of the prior art in which protector-mounting tabs are bolted directly to shelf ends and to angle irons which are welded to an existing protector bar where shelf ends are not in alignment with a mounting tab.

FIG. 27 is a partial side view of protectors mounted according to still another prior art mounting technique in which mounting holes are provided on exact centers along a protector-mounting bar bolted to selected frame shelves.

DESCRIPTION OF THE PREFERRED EMBODIMENT

Figure 1:
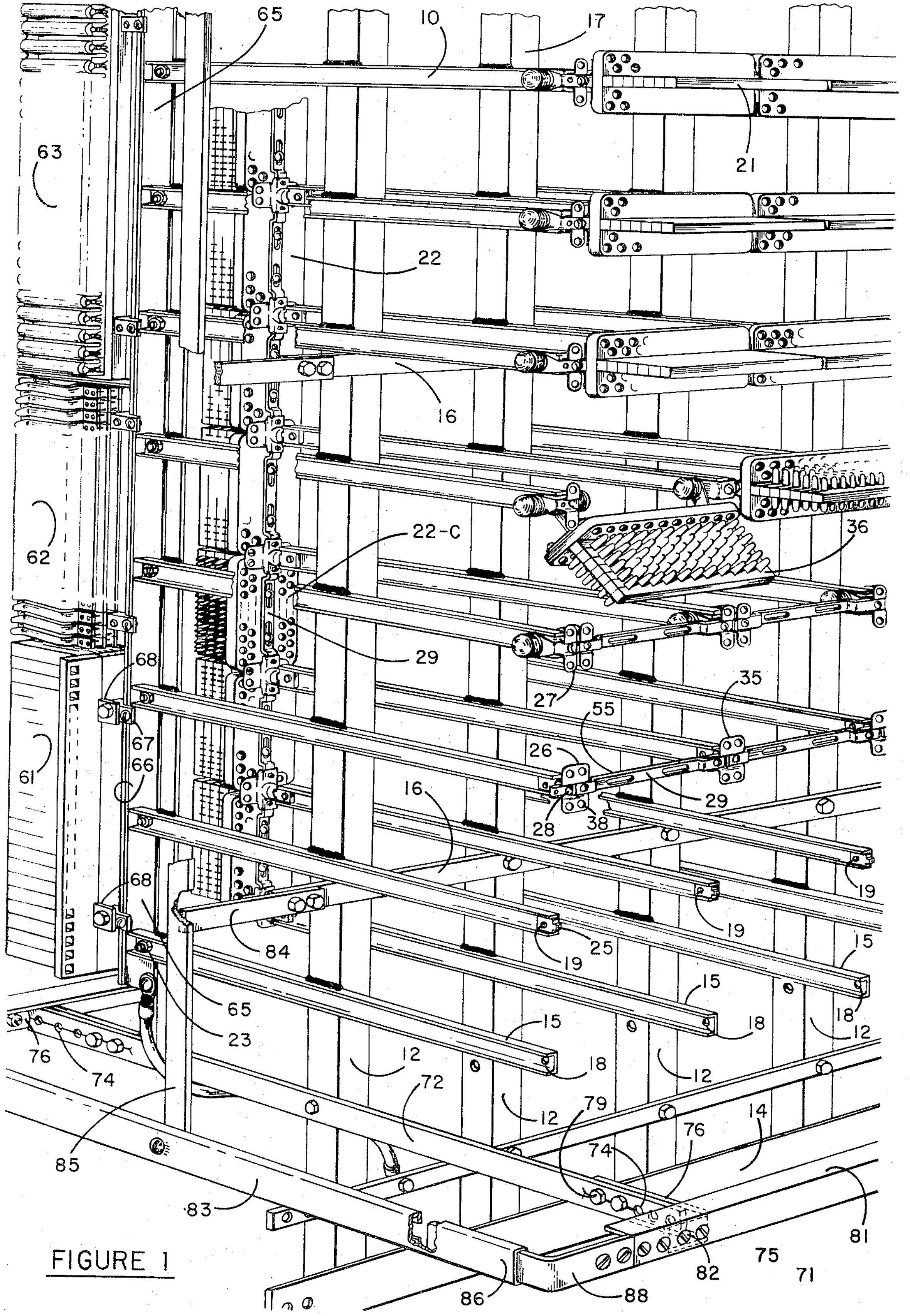
FIG. 1 is a partial perspective view of a telephone distribution equipment mounting frame and system according to the present invention.

Referring now to FIG. 1 of the drawings, the mounting frame 10 of the present invention comprises a plurality of metal vertical support members 12 which are secured at evenly-spaced, horizontal intervals along a metal horizontal base member 14. Secured at evenly-spaced, vertical intervals along each vertical support member 12 are a plurality of metal horizontal support members 15. In keeping with the established telephone distribution frame terminology, horizontal support members 15 shall hereinafter be referred to as "shelves" and a vertical support member 12 together with its complement of "shelves" 15 shall hereinafter be referred to as one "upright" and shall be identified by the numeral 17. Each shelf 15 has an aperture 18 proximate each end. Apertures 18 are in turn adapted to receive the various distribution equipment mounting apparatus in accordance with the invention mounting system.

Figures 2, 3, 4, 5, 6, 7, 8, 9, 10, 11, 12, 13, 14:
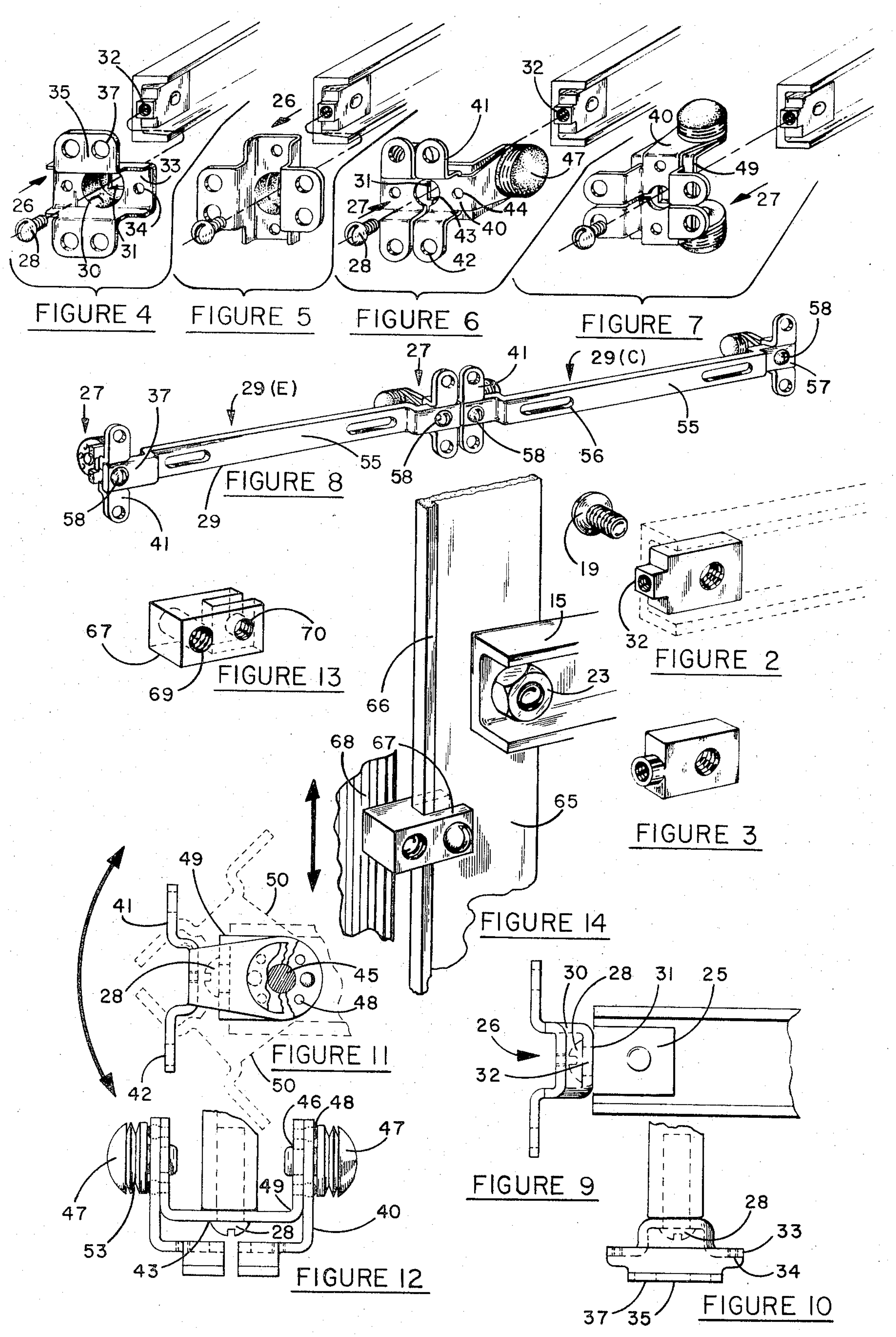
FIG. 2 is a perspective view of a terminal block mounting lug showing in dashed lines its mounting relation to a horizontal support member or "shelf" according to the invention.
FIG. 3 is a perspective view of an alternate terminal block mounting lug according to the invention.
FIG. 4 is an exploded perspective view of a stationary mounting bracket employed in the invention and adapted to be secured to a shelf fitted with a FIG. 2 type mounting lug whereby to assume a horizontal terminal block mounting configuration.
FIG. 5 shows the same bracket and shelf as in FIG. 4 but wherein such bracket has been rotated 90° to assume a vertical terminal block mounting configuration.
FIG. 6 is an exploded perspective view of a movable mounting bracket employed in the invention and adapted to be secured to a shelf fitted with a mounting lug whereby to assume a horizontal terminal block mounting configuration.
FIG. 7 shows the same movable bracket and shelf as in FIG. 6 but wherein such movable bracket has been rotated 90° to assume a vertical terminal block mounting configuration.
FIG. 8 is a partial perspective view of two adjacent mounted stiffening members according to the invention, one being shown in a recessed position adapted for mounting end-mounted terminal blocks and one being shown in a protruding position adapted for mounting center-mounted terminal blocks.
FIG. 9 is a side view of a stationary terminal block mounting bracket mounted in a horizontal mounting configuration to a shelf fitted with a mounting lug, the latter being shown in dashed lines.
FIG. 10 is a top plan view of a stationary block mounting bracket shown in a vertical mounting configuration.
FIG. 11 is a cutaway side view of a movable terminal block mounting bracket mounted in a horizontal mounting configuration revealing a ball detent means for retaining each movable ear of said bracket in pivoted 45° positions indicated by dashed lines.
FIG. 12 is a top plan view of the same movable bracket and in the same mounting configuration as shown in FIG. 11.
FIG. 13 is a perspective view of a protector mounting clamp according to the invention.
FIG. 14 is a partial perspective view showing a portion of a protector secured to a FIG. 13 type mounting clamp which has been slidably secured to the protector mounting bar of the invention.

For purposes of mounting terminal blocks, whether in a horizontal configuration hereinafter represented by 21 or in a vertical configuration hereinafter represented by 22, there is provided a plurality of metal mounting lugs 25 which are best shown in FIG. 2. Lugs 25 are secured by appropriate bolts 19 which are received by the respective apertures 18 at the end of each shelf 15 which is to support a terminal block. In the instant invention, any adjacent pair of shelves 15 (either horizontally or vertically) may be adapted to support a terminal block therebetween. Shelves 15 are typically situated on 8 inch vertical and horizontal centers, but may vary according to the length of terminal block being employed. A plurality of frame stiffening bars 16 are used to maintain the uprights 17 at the proper horizontal intervals and to prevent swaying. Mounting lugs 25 are adapted to receive either a stationary terminal block mounting bracket 26, also shown in FIGS. 9 and 10 or, interchangeably, pivotal terminal block mounting bracket 27, also shown in FIGS. 11 and 12.

Each stationary bracket 26 and pivotal bracket 27 is adapted to be secured by a screw 28 to a mounting lug 25. In accordance with this invention and the established telephone distribution art, it is contemplated that at least a portion of each equipment frame comprised of two or more uprights 17 shall include lugs 25 for purposes of mounting terminal blocks. Lugs 25 shall therefore be considered an integral part of frame 10 and in fact may be integrally secured thereto, if desired. FIGS. 4 and 5 show a stationary terminal block mounting bracket 26 in a horizontal mounting position (FIG. 4) and in a vertical mounting position (FIG. 5). Similarly, FIGS. 6 and 7 show a pivotal terminal block mounting bracket 27 in a horizontal mounting position (FIG. 6) and in a vertical mounting position (FIG. 7). Referring to FIG. 4, mounting bracket 26 is adapted to include a recessed cylindrical portion 30 having at one end a somewhat rectangular-shaped opening 31 adapted to receive a corresponding rectangular projection 32 (FIG. 2) from lug 25. Bracket 26 also includes a base portion 33, best shown in FIG. 10, provided with threaded apertures 34 for the receipt of stiffening members, later described, and further includes integrally formed, somewhat L-shaped mounting lands 35 with apertures 37 which are adpated to mount terminal blocks of the end-mounted type.

Referring specifically to FIG. 6, each movable bracket 27 includes a pair of generally L-shaped ears 41 having apertures 42 which are adapted to secure end-mounted terminal blocks. The ears 41 are integrally formed on a respective pair of generally L-shaped side arms 40. Side arms 40 each include a threaded aperture 44 for securement of a stiffening member, later described. Each side arm 40 also has an aperture 45, beast shown in FIG. 11, adapted to receive an appropriate rivet 47 and ball detent system 48 for pivotal securement with a generally U-shaped yoke 49. Said U-shaped yoke 49 is provided with corresponding apertures 46 (FIG. 12) for securement of said rivet 47 and operation of said ball detent system 48, and is also provided with a somewhat rectangular aperture 43 for fitted and screw securement to lug projection 32 by appropriate screw means 28. As shown in cutaway, FIG. 11, pivoting is adapted by ball detent means 48 which temporarily secures each ear 41 independently at 45° pivoted positions 50 (indicated by dashed lines).

Referring to FIG. 12, it should be noted that rivets 47 are, in preferred form, provided with smooth rounded heads 52 which tend not to catch or interfere with wires when terminal blocks are being wired or serviced. In addition, resilient washers 53 secured by said rivets are adapted to exert pressure on said ball arm 40 and ball detent system 48 enabling the above mentioned 45° pivotal positions as well as the normal forward position shown in said lines, FIG. 11, to be maintained for as long as is desired. Since detent means of this kind are generally well-known as to structure even though not heretofore employed in this manner, no further explanation is deemed necessary. It is contemplated that a rectangular bracket aperture 31 (FIG. 4) or aperture 43 (FIG. 6) and corresponding rectangularly-shaped lug tip 32 will afford each bracket greater mounting stability than other lug and aperture shapes, but an alternate circular-tipped lug is shown in FIG. 3 to demonstrate that lug and bracket aperture shapes may vary significantly without losing the advantages of the invention.

Referring now to FIGS. 1 and 8 a metal sitffening member 29 forming part of the invention system is adapted to be detachably secured at each end to a pair of adjacent mounting brackets 26 or 27. Stiffening member 29 generally comprises an elongated central body portion 55 with elongated apertures 56 which are adapted to mount terminal blocks of the center mounted type. Somewhat L-shaped ends 57 are bent at right angles to the central body portion 56 and include apertures 58 for screw securement of the stiffening member 29 with either type of bracket 26 or 27, brackets 27 being shown in FIG. 8.

Referring specifically to FIG. 8, stiffening member 29 is adapted in one mode to occupy a slightly recessed position represented by 29E with respect to the mounting face of ears 41 for purposes of mounting a so-called end mounted terminal block (not shown). In another mode by 180° reversal the stiffening member 29 is adapted to be secured in a somewhat projecting position represented by 29C, FIG. 8, wherein said central body portion 55 is adatped to extend somewhat past the mounting faces of ears 41 for purposes of mounting so-called center mounted terminal blocks directly to said central body portion 55.

In keeping with prior art terminology, a "center mounted" terminal block (not specifically shown) is adapted to be secured along a longitudinal, medially-located mounted strip integral with the fanning strip of said block, while an "end mounted" terminal block (not specifically shown) is adapted to be secured by integral mounting plates located proximate the respective ends of the block, or alternately, by apertures integrally formed in ends of the block itself.

Of importance to note is the fact that brackets 27 shown in FIG. 8 in a horizontal mounting position may be rotated 90° to a vertical mounting position enabling either so-called end- or center-mounting terminal blocks to be readily mounted in any desired horizontal or vertical configuration. In addition, pivotal mounting brackets 27 further enable conventional center- or end-mounting terminal blocks when mounted in either horizontal or vertical configuration to be at the same time adapted for pivotal movement 45° laterally to each side of the mounting plane. This is represented by terminal block 36 of FIG. 1 shown in a 45° downward pivoted position. Of further importance to note is that specially fabricated terminal blocks have a built-in pivotal feature are well-known in the art and are much more expensive than non-pivotal terminal blocks. This invention, on the other hand, provides pivoting which is highly desirable when wiring or servicing the blocks, for virtually any conventional center- or end-mounted terminal block, at absolutely nominal expense.

Protectors are normally vertically oriented as a matter of convention in the stated art, as previously stated. In an improved mounting system for protectors according to the invention, a vertical protector mounting bar 65 (FIGS. 1 and 14) is detachably secured along sslected ends of shelves 15 along one upright 17 by means of bolts 23 extending through the appropriate shelf apertures 18. Protector mounting bar 65 includes an L-shaped outer edge 66 which is adapted to form a track for the reception of protector mounting clamps 67, also shown in FIG. 13, which are adapted to be slidably secured thereto. As is emphasized in FIG. 1, protectors 61, 62, and 63 are of different physical construction to typically represent protectors of different given manufacturers having different overall lengths and center distances between mounting tabs 68. As shown in FIGS. 13 and 14 each mounting clamp 67 comprises a somewhat U-shaped rectangular block which includes a threaded aperture 69 adapted for screw securement of a protector, best seen in FIG. 1, and a threaded aperture 70 adapted for screw securement of clamp 67 to mounting bar 65. It is apparent that mounting clamps 67 are particularly well adapted to accommodate different mounting center distances due to their being attachable to any length protector and to being slidably secured along protector mounting bar 65.

Referring again to FIG. 1, in addition to the features already point out a mounting frame according to the preferred embodiment also includes an adjustable guard rail means 71 which comprises a plurality of elongated horizontally disposed support bars 72 detachably secured to selected vertical support members 12 at a vertical distance of approximately one foot from base member 14. Support bars 72 include a plurality of apertures 74 proximate each end 75 which enable adjustable securement of appropriate angle braces 76 having a plurality of mating apertures 78, not shown. The support bar ends 75, as well as the corresponding surfaces of angle braces 76, may be bent as shown in FIG. 1 to better withstand downward forces and avoid shearing bolts 79. Angle braces 76 are adapted to mount an elongated guard rail 81 by appropriate screws 82. The assembled support bars 72, adjustable angle braces 76 and guard rails 81 are adapted to extend horizontally outward past the furthest point of exposed mounted terminal blocks and protectors so as to protect any frame mounted equipment from accidental breakage from equipment carts, rolling ladders, etc., when the same are moved in the aisles. Such an adjustable guard rail 71 enables a central office or switching facility to maintain protection of outwardly expanding distribution equipment without requiring removal of the old guard rail and welding of a new immovable guard rail as has heretofore been the practice in the prior art. In the preferred embodiment, such an adjustable guard rail 71 is also adapted to include an end rail assembly 83 to mount respective end uprights 17 of a given row. An end rail assembly according to the invention is adapted to be vertically suspended from detachable extensions 84 of stiffening rods 16 and a vertical end rail support 85 welded thereto and bolted to end rail 83. Such an end rail assembly may comprise, for example, a length of open rectangular tube steel 86 which is adapted to slidably receive the corner braces 88 that are shown detachably secured to guard rail assembly 71. Thus, as guard rail 71 is inwardly or outwardly adjusted, corner braces 88 are adapted to ride inside end rail 83 so as to form one continuous adjustable guard rail assembly peripheral to any given equipment supporting frame.

It is apparent from what has been stated so far that the mounting frame and system of the present invention provides the unique capability of mounting center- or end-mounted terminal blocks in either vertical or horizontal positions, or both, while at the same time enabling pivoting of the conventional terminal blocks. In addition, protectors having different physical construction and mounting tab center distances can now be readily mounted on the same protector bar. Such a frame and system has the advantage of easily adapting to existing frames equipment configurations, and in new installations provides a large degree of equipment-mounting flexibility.

For purposes of furnishing the reader with a better understanding of the objects and advantages of this invention, the description will now turn to a discussion in connection with the drawings of the various cases of the prior art to which this invention is directed. Subsequently, the description will explain how each of the various prior art practices of mounting conventional terminal blocks and/or protectors are all now achieved in an universal equipment frame and mounting system according to the present invention.

FIGS. 15 through 27 generally represent known prior art techniques for mounting terminal blocks and protectors to distributing frame assemblies. Referring now to FIG. 15, one wellknown technique of mounting end-mounted terminal blocks 22-E along a vertical plane has been to secure a mounting clip 90, by bolt 91 or other means, to the ends of selected shelves 15 and then to secure one end from each of two adjacent terminal blocks 22-E to said clip 90. This mounting technique provides rigid mounting of end-mounted terminal blocks only, and only in a vertical position, however. As an alternate vertical-mounting technique to the above, FIG. 16 shows a center-mounted terminal block mounting bar 92 secured by welded joints 93 to selected said shelves 15. Holes 94 (indicated in dashed lines) drilled on precise centers are adapted to receive appropriate screws 96 adapted to secure said terminal blocks 22$^{C}$ to said mounting bar 92.

Referring to FIG. 17, still another technique for vertical mounting of terminal blocks employs a continuous maple strip 22M serving as a base and fanning strip from which to assemble terminal strips 95 directly thereupon. Such maple strip is secured by a special type of clip 97 which is employed only in securing maple strip types of blocks.

Referring now to FIG. 18, one prior art technique of horizontal mounting end-mounted terminal blocks 21-E requires the use of still another type of mounting clip 99 adapted for securement to selected said shelves 15 but which will only mount the stated class of terminal block in the stated position, however.

Referring to FIG. 19, some types of end-mounted terminal blocks 23-E employ mounting holes 101 (shown in dashed lines) integrally formed into the fanning strip 103. One widely used technique of mounting such blocks has been to form an "easy bend" 105 at the ends of selected horizontal shelves 15 and to secure a predrilled mounting bar 106 thereto by appropriate bolts 107. Terminal blocks 23-E are then mounted and secured thereon by appropriate screw means 109. One notable disadvantage of this type of mounting is the undesirable concealment of holes in fanning strip 103 due to the normally large width of mounting bar 106. Still another technique of horizontal mounting shown in FIG. 20 must be employed when using horizontally mounted continuous maple strip terminal blocks and a different mounting clip 110 from any clips heretofore mentioned is utilized.

Referring to FIG. 21, still another mounting technique has been employed in the prior art for horizontally mounting center mounted terminal blocks 22-C. An angle bracket 112 is herein adapted to be welded directly to shelf 15 and secured to the back of terminal block 22-C.

Referring to FIG. 22, another prior art mounting technique for horizontally end-mounted terminal blocks 22-E has employed an angle bracket 113 welded directly to a shelf 15, a continuous stiffening rod 115 welded to said bracket 113 and a plurality of predrilled rectangular plates 116 welded to said stiffening rod 115, on which is adapted to mount said terminal blocks 22-E. These final two terminal block mounting techniques are highly inflexible and permanent.

At this point, based on the above, it is apparent that mounting of even two types of terminal blocks in both horizontal as well as vertical configurations entails different mounting hardware for each different class of block and each different mounting plane. This is compounded, as will be described, by mounting of protector units which have also previously required specialized mounting hardware and techniques.

Referring now to FIG. 23 one widely used prior art technique for mounting protector units 60 has been to secure by welded joints 120 a protector mounting bar 122 previously drilled on precise centers to accept specified protectors 60, 61 to selected said shelves 15. The specified protector units 60, 61, 62 are then secured by bolts 123 to mounting bar 122. A second prior art mounting technique, shown in FIG. 24, for mounting of protectors makes use of a conventional protector bar 125 previously welded to said shelves 15, and provides a protector mounting strip 126 formed of L-shaped angle iron, one side of which 128 has been drilled on exact centers to accept specified protectors 60–61, and an opposite side of which 129 has been drilled for bolted securement to said protector bar 125. A third known prior art technique of mounting protectors shown in FIG. 25 employs elongated slots 131 in a detachable protector bar 132 adapted to be detachably secured to selected shelves in place of a conventional bar having precisely predrilled holes. Such a protector mounting bar as shown in FIG. 25 will admittedly exhibit increased flexibility in mounting physically different protector units along the same protector bar. Quite often, however, such a protector bar precludes close spacing of protector units and results in unused frame space. As previously described, this invention enables infinite flexibility in mounting protector units such that positioning and proximate spacing of different protector units is no longer a problem.

Referring now to FIG. 26 which shows yet another known method of protector mounting, protectors herein of the so-called interlocking type 64 have been detachably secured at one location 136 directly to a shelf 15 and at another location 137 to a length of channel iron 135 which has been welded to an existing protector bar 138. Unused shelves 15 have been trimmed off as shown at A and B. Such mounting technique is a highly custom and inflexible installation quite frequently found in the prior art, however. An even further mounting technique shown in FIG. 27 has been to detachably secure protectors 60, 61 to a predrilled mounting bar 140 which is in turn adapted for detachable securement by appropriate bolts 142 to selected said shelves 15.

It is commonplace in the telephone industry that a given manufacturer will choose protector mounting centers without regard for a competitor's predrilled mounting bar. Thus, it is in the field that the problem of matching components to frames is realized. The problem of a multitude of specialized mounting bars, clips and supporting hardware is even further compounded by a multitude of specialized distribution equipment frames which can only be practically used with a designated manufacturer's distribution equipment. Such differences in frames themselves should be apparent to those skilled in the art, requiring no further elaboration herein.

Referring next to FIGS. 28–34, the pivotal mounting brackets of the preferred embodiment are shown in a variety of positions adapted to receive end- and center-mounted terminal blocks in both horizontal as well as vertical orientations. It should be understood that two adjacent frame shelves are employed to mount any one block, and that a non-pivotal mounting bracket heretofore also described is equally adapted to mount the various blocks shown as in the pivotal bracket.

Figure 29:
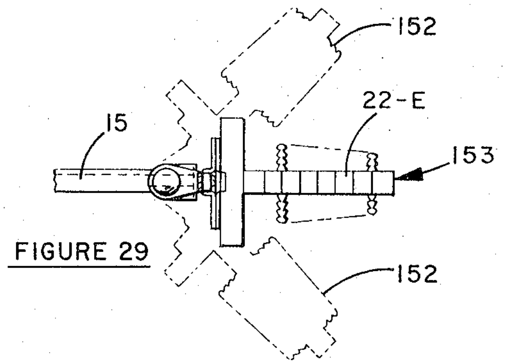
FIG. 29 is a top view of the same bracket and terminal block assembly shown in FIG. 28, showing in dashed lines 45° pivoted positions of the terminal blocks.
Figure 28:
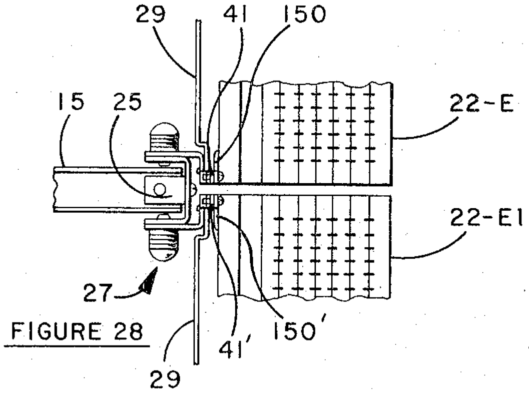
FIG. 28 is a partial side view of vertically end-mounted terminal blocks mounted on a movable mounting bracket according to the instant invention.

Referring now to FIG. 28, according to the invention vertically end-mounted terminal blocks 22-E, 22-E' are adapted to be secured to movable ears 41 of a movable mounting bracket 27 previously secured to a shelf 15 earlier mentioned lug means 25. One mounting plate 150 of a first terminal block 22-E is secured to a first movable ear 41, while one mounting plate 150' of a second terminal block 22-E' is secured to an opposite ear 41'. In this embodiment stiffening members 29, secured to adjacent vertical pairs of pivotal mounting brackets 27 provide support only. As shown in FIG. 29, end-mounted blocks 22-E are adapted for 45° pivotal movement around a vertical axis. Dashed lines indicate the "stop" positions 152 to each side of the normal forward position 153 (shown in solid lines).

Figure 31:
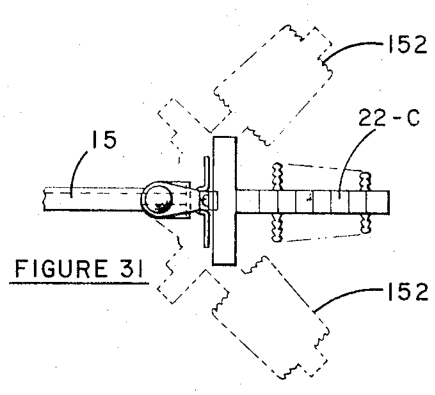
FIG. 31 is a top view of the same bracket, stiffening member, and terminal block assembly shown in FIG. 30 showing in dashed lines 45° pivoted positions of the terminal blocks.
Figure 30:
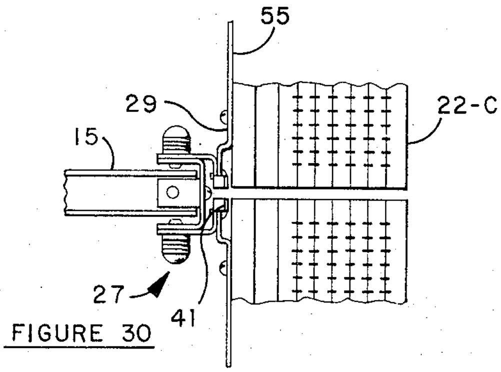
FIG. 30 is a partial side view of vertically center-mounted terminal blocks mounted on a stiffening member secured to a movable bracket according to the instant invention.

Referring now to FIG. 30, vertically center-mounted terminal blocks 22-C are adapted to be secured to stiffening members 29 which are adapted to extend between two vertically adjacent pairs of brackets 27 (only one shown). In this embodiment, stiffening member 29 is adapted to assume a 180° reversed position 55 from that shown in FIG. 28 having its body portion extending outward past the face of said mounting ears 41 in order to mount an adjacent pair of center-mounted terminal blocks 22-C. Mounting ears 41 are cleared by said mounted terminal block 22-C, and in this embodiment serve only to provide pivotal support to said stiffening members 29. FIG. 31 demonstrates 45° pivotal movement provided to each side of a vertical axis, with "stop" positions 152 indicated by dashed lines.

Figure 33:
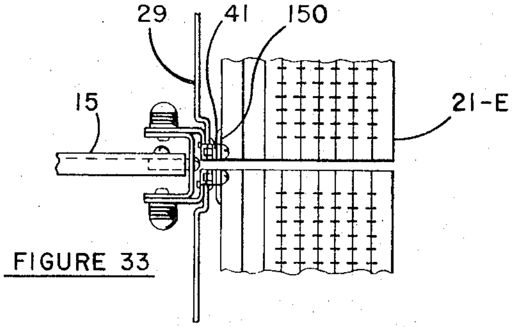
FIG. 33 is a top view of the same bracket and terminal block assembly shown in FIG. 32.
Figure 35:
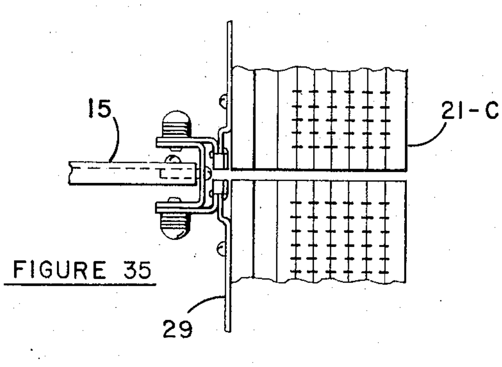
FIG. 35 is a top view of the same bracket and terminal block assembly shown in FIG. 34.
Figure 32:
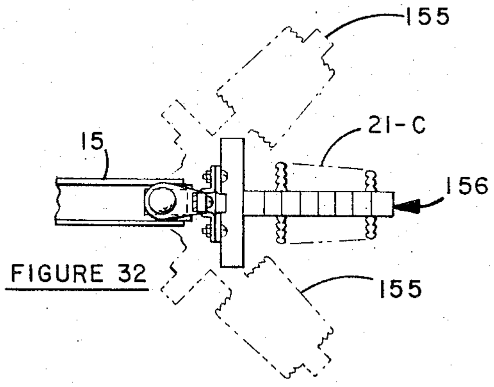
FIG. 32 is a partial side view of horizontally end-mounted terminal blocks mounted on a movable mounting bracket according to the invention and also showing in dashed lines 45° pivoted positions of the terminal blocks.
Figure 34:
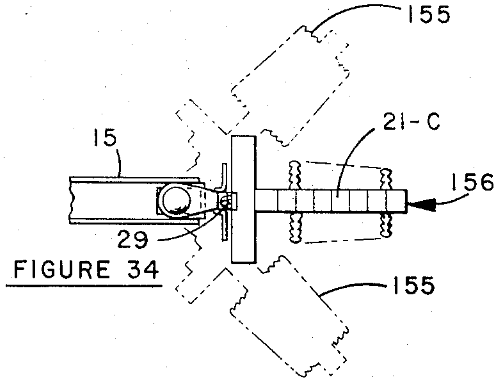
FIG. 34 is a partial side view of horizontally center-mounted terminal blocks mounted on a stiffening member secured to a movable bracket according to the invention, and also showing in dashed lines 45° pivotal positions of the terminal blocks.

Referring next to FIG. 32 pivotal mounting bracket 27 has been mounted on a shelf 15 in a 90° rotational position from what previously shown in FIGS. 28 through 31 in order to enable horizontal mounting of end-mounted terminal blocks 21-E. In the embodiment shown 45° pivoting is provided to each side of the horizontal forward mounting position 156, with "stop" points 155 indicated by dashed lines. Referring to FIG. 33, when horizontally mounting the end-mounted terminal blocks 21-E shown, stiffening member 29 is adapted to assume an inward position identical with that shown in FIG. 28 which enables the terminal block mounting plates 150 to be secured directly to the movable ears 41. Referring now to FIGS. 34 and 35, horizontally center mounted terminal blocks 21-C are mounted by securement to stiffening member 29 and are adapted to assume an outward position identical with that shown in FIG. 30. Pivoting 45° to each side of a horizontal forward position 156 is again provided with "stop" position 155 indicated by dashed lines.

Briefly comparing the four invention terminal block mounting embodiments described above, with those of the previously described prior art, the mounting technique of FIG. 51 is accomplished by the invention embodiment shown in FIG. 28. The prior art mounting techniques of FIGS. 16 and 17 are accomplished by the invention embodiment shown in FIG. 30. The prior art mounting technique of FIGS. 18, 19 and 22 are accomplished by the invention embodiment of FIG. 32. Finally, the prior art mounting techniques shown in FIGS. 20 and 21 are accomplished by the invention embodiment shown in FIG. 34. Of noteworthy importance is the fact that the instant invention has achieved the various prior art terminal block mounting techniques by employing a simplified system of interchangeable hardware comprising an absolute minimum of parts in combination with a single mounting frame adapted to receive said parts in virtually any described mounting configuration.

Referring again to FIG. 14 with respect to protector mounting in the instant invention as compared with prior art practice, it should be recognized that by employing a novel mounting clamp 67 and protector mounting bar 65 this invention readily achieves all the stated prior art protector mounting techniques shown in FIGS. 23 through 27. Such novel mounting furthermore enables a telephone office to install a variety of protector makes having different mounting center distances along a single given protector mounting bar 65. Such an advantage will be welcomed particularly by smaller telephone companies which are often forced to employ used and non-uniform equipment due to cost considerations.

Summarizing what has been stated above, it is apparent that the present invention provides a telephone distribution equipment mounting frame and system which is unique in simplicity as well as versatility. Mounting of terminal blocks of various styles and different manufacturers is provided in virtually any desired horizontal or vertical mounting configuration. At the same time, the mounting of various different types and styles of protectors is readily available as is easy alteration when required at a later date. An adjustable guard rail is adapted to adjust with the addition or deletion of equipment providing constant protection of mounted equipment and rendering the mounting frame and system with even greater flexibility. Finally, it is apparent that what has been invented is a truly universal telephone distribution equipment mounting frame and system capable of providing an extremely simple and economical means of achieving virtually all conventional terminal block and protector mounting techniques in a single frame and system.

It should be noted that the terms "stiffening bar" and "stiffening member " as used in the above description and in the claims which follow denote separate structural elements. The two terms have been selected in keeping with accepted prior art terminology. Thus, the term "stiffening bar" which designates a relatively long metal bar rigidly secured to a plurality of vertical members for the sole purpose of strengthening the mounting frame should not be confused with the term "stiffening member" which designates a relatively short metal bar having laterally offset ends which is adapted to be detachably secured between selected mounting brackets and provide stiffening support as well as means for mounting center mounted types of terminal blocks.

What is claimed is:

1. A metallic universal mounting frame and system for telephone distribution equipment comprising, in combination:

a. a plurality of uniform length parallel vertically positioned laterally aligned and evenly spaced bar members secured to a base means;

b. a plurality of horizontally disposed stiffening bars removably secured at evenly spaced vertical intervals to said vertical bar members;

c. a plurality of shelf bar members of uniform length horizontally mounted at evenly spaced vertical interavals along each vertical bar member, each shelf bar member being rigidly secured intermediate its length to the vertical bar member on which it is mounted and having an aperture proximate each shelf bar member end;

d. a plurality of bracket mounting lugs secured to selected shelf bar member ends, each said lug providing a mounting connection configuration compatible with a corresponding mating bracket connection;

e. a plurality of terminal block mounting brackets detachably secured by mating connection means to selected ones of said mounting lugs and being adapted for either horizontal or vertical orientation and having appropriate mounting apertures disposed on opposed mounting surfaces provided thereon enabling horizontal or vertical mounting of end mounting terminal blocks interchangeably between selected similarly horizontally or vertically oriented adjacent brackets;

f. a plurality of stiffening members of uniform length each comprising a relatively short narrow bar having a central body portion including a plurality of apertures and having parallel and laterally offset end portions each provided with an aperture adapted to receive appropriate screw means for detachably securing each said stiffening member between selected said mounting brackets, said central body portion being adapted for securement in either an inward or outward extending mode in relation to the mounting surface of said brackets whereby mounting in an inward extending mode enables end mounting of a terminal block directly to a selected pair of brackets with said stiffening member providing stiffening support only, and whereby in an outward extending mode enables center mounting of a terminal block directly on said stiffening member;

g. protector mounting bar means vertically positioned and removably secured to the ends of selected vertically adjacent said shelf bar members, each protector mounting bar means providing a continuous uniform clamp surface for the length thereof;

h. protector mounting clamp means adapted to engage a selected said clamp surface and removably secure protectors onto said protector mounting bar means at any selected vertical position thereon; and i. adjustable guard rail means extending substantially the length of a given row of vertical bar members and being detachably secured to selected said vertical bar members.

2. A mounting frame and system as claimed in claim 1 wherein at least a portion of said mounting brackets include pivotal bracket means comprising a yoke adapted to be removably secured to a selected mounting lug, and a pair of substantially L-shaped mounting arms pivotally secured to opposite sides of said yoke and providing two distinct outwardly disposed mounting surfaces on each mounting arm thereby enabling independent pivotal securement of a terminal block mounted between adjacent said pivotal bracket means.

3. A mounting frame and system as claimed in claim 1 wherein at least a portion of said mounting brackets are adapted to include stationary bracket means formed of unitary construction and adapted to be removably secured to a selected mounting lug, and providing outwardly disposed mounting surfaces and appropriate apertures in said mounting surfaces enabling stationary mounting of a terminal block mounted between adjacent said stationary bracket means.

4. A mounting frame and system as claimed in claim 1 wherein at least a portion of said mounting lugs each include a rectangular projection thereon adapted to extend slightly outward from said shelf end when said lug is in mounted position and having a threaded centrally located aperture on said rectangular projection adapted to receive an appropriate screw for securing a selected said mounting bracket to said lug.

5. A mounting frame and system as claimed in claim 4 wherein at least a portion of said mounting brackets each include a substantially rectangular aperture adapted to matingly receive a respective said rectangular projection on a said mounting lug enabling substantially rigid detachable securement thereto .

6. A mounting frame and system as claimed in claim 1 wherein said adjustable guard rail includes adjustable end rail means secured to selected said stiffening bars and adapted for positioning adjacent a selected last said vertical bar member in a given row of vertical bar members and which is adapted for cooperative adjustable securement to said guard rail.

7. A mounting frame and system as claimed in claim 2 wherein at least some of said pivotal bracket means include spring loaded ball type detent means enabling such bracket means and any terminal block mounted thereon to be releasably held at angular positions.

* * * * *